US011373193B2

(12) United States Patent
Lane

(10) Patent No.: US 11,373,193 B2
(45) Date of Patent: Jun. 28, 2022

(54) ANTI-DIVERSION, ANTI-COUNTERFEITING PRODUCT PACKAGING

(71) Applicant: TRACKTECH SOLUTIONS CORP., Toronto (CA)

(72) Inventor: Sanford Lane, Sherborn, MA (US)

(73) Assignee: Tracktech Solutions Corp., Toronto (CA)

( * ) Notice: Subject to any disclaimer, the term of this patent is extended or adjusted under 35 U.S.C. 154(b) by 24 days.

(21) Appl. No.: 16/083,670

(22) PCT Filed: Mar. 10, 2017

(86) PCT No.: PCT/US2017/021927
§ 371 (c)(1),
(2) Date: Sep. 10, 2018

(87) PCT Pub. No.: WO2017/156467
PCT Pub. Date: Sep. 14, 2017

(65) Prior Publication Data
US 2019/0095928 A1    Mar. 28, 2019

Related U.S. Application Data

(60) Provisional application No. 62/307,219, filed on Mar. 11, 2016, provisional application No. 62/377,378, filed on Aug. 19, 2016.

(51) Int. Cl.
G08B 13/14      (2006.01)
G06Q 30/00      (2012.01)
B65D 77/04      (2006.01)
G06K 19/10      (2006.01)
G06K 19/077     (2006.01)
(Continued)

(52) U.S. Cl.
CPC ......... G06Q 30/0185 (2013.01); B65D 25/54 (2013.01); B65D 77/044 (2013.01); G06F 16/9532 (2019.01); G06F 16/9554 (2019.01); G06K 19/06028 (2013.01); G06K 19/06037 (2013.01); G06K 19/0723 (2013.01); G06K 19/07758 (2013.01); G06K 19/10 (2013.01); G06Q 10/0833 (2013.01); B65D 2203/10 (2013.01); B65D 2203/12 (2013.01);
(Continued)

(58) Field of Classification Search
CPC ...................... B65D 2203/10; B65D 2203/12; B65D 25/54; B65D 77/044; G06F 16/9532; G06F 16/9554; G06K 19/06028; G06K 19/06037; G06K 19/0723; G06K 2019/06253; G06Q 10/0833; G06Q 30/0185
USPC ....................................................... 340/572.1
See application file for complete search history.

(56) References Cited

U.S. PATENT DOCUMENTS 6,226,619 B1 * 5/2001 Halperin .......... G06K 19/07758
                                                  705/23
6,490,030 B1 * 12/2002 Gill ...................... G01J 3/42
                                                  356/71

(Continued)

FOREIGN PATENT DOCUMENTS

CN       204368684 U     6/2015

Primary Examiner — Naomi J Small
(74) Attorney, Agent, or Firm — Occhiuti & Rohlicek LLP

(57) ABSTRACT

In one aspect, the present invention features an identification tag as described herein. In a related aspect, the invention features packaging for a product that includes the identification tag and is useful in discouraging and/or detecting counterfeiting and product diversion.

25 Claims, 12 Drawing Sheets

(51) Int. Cl.
  *G06F 16/9532* (2019.01)
  *G06F 16/955* (2019.01)
  *B65D 25/54* (2006.01)
  *G06K 19/06* (2006.01)
  *G06K 19/07* (2006.01)
  *G06Q 10/08* (2012.01)

(52) U.S. Cl.
  CPC ............... *G06K 19/07798* (2013.01); *G06K 2019/06253* (2013.01)

(56) References Cited

U.S. PATENT DOCUMENTS

| | | | | |
|---|---|---|---|---|
| 2007/0182564 | A1* | 8/2007 | Abbott | B65D 41/045 340/572.8 |
| 2007/0296599 | A1* | 12/2007 | Wang | B65D 55/028 340/572.8 |
| 2008/0068179 | A1* | 3/2008 | Meyer | B65D 55/028 340/572.8 |
| 2008/0149584 | A1* | 6/2008 | Martinelli | G06Q 10/08 215/202 |
| 2008/0309495 | A1* | 12/2008 | Chisholm | G06K 7/10178 340/572.1 |
| 2009/0242446 | A1* | 10/2009 | Abbott | B65D 25/205 206/459.5 |
| 2009/0273451 | A1* | 11/2009 | Soppera | G06K 19/0723 340/10.4 |
| 2010/0102967 | A1* | 4/2010 | Lee | B65D 51/245 340/572.8 |
| 2011/0027150 | A1 | 2/2011 | Tuffet et al. | |
| 2016/0192188 | A1* | 6/2016 | Coulier | H04W 12/069 380/270 |
| 2016/0247193 | A1* | 8/2016 | Altfeder | G06Q 30/0255 |
| 2017/0297798 | A1* | 10/2017 | Simonetti | B65D 75/366 |
| 2018/0039806 | A1* | 2/2018 | Harrison | G06K 19/06037 |
| 2019/0043059 | A1* | 2/2019 | Xie | G06Q 20/40 |

* cited by examiner

ANTI-DIVERSION, ANTI-COUNTERFEITING PRODUCT PACKAGING

CROSS REFERENCE TO RELATED APPLICATIONS

This application is a National Stage of International Application No. PCT/US2017/021927 filed on Mar. 10, 2017, which claims the priority date to U.S. provisional application 62/307,219 filed on Mar. 11, 2016, and U.S. provisional application 62/377,378, filed on Aug. 19, 2016, the contents of which are hereby incorporated by reference in their entirety.

FIELD OF THE INVENTION

This invention relates to compositions and methods for marking and tracking commercial products in a manner that facilitates, inter alia, detecting and managing product diversion and counterfeiting. The compositions include product packaging that comprises an identification tag that has two components: a radio frequency identification device (RFID) and identification information that is separately detectable (e.g., by eye).

BACKGROUND OF THE INVENTION

In commerce, companies strive to control the movement and pricing of their products as those products move through the distribution chain to a consumer. These important controls are threatened by counterfeiting, which brings substandard products to the consumer, and diversion, which brings genuine products to consumers prematurely or inappropriately through an unauthorized seller. Short-circuiting the planned distribution channels allows a diverter or counterfeiter to undercut the manufacturer's controlled customer-pricing model while taking unfair advantage of the true owner's marketing and sales efforts. The negative impact on product image, pricing, and profitability can be significant. In some instances, product diversion can damage a branded product so severely that it destroys the market potential of the product over time. The devious practices of counterfeiting and product diversion have been aided by the internet and e-commerce, and there remains a need for products and processes to detect and discourage them.

SUMMARY OF THE INVENTION

An object of the present invention is to provide compositions and methods for packaging a product in a manner that facilitates tracking that product from one location to another (e.g., from its origin to its final destination as well as between any one or more of the points between the origin (e.g., the place of manufacture) and the final destination (e.g., a retail store or the ultimate point of contact with a consumer)). Any commercial product can be marked and tracked using the compositions, systems, and methods described herein. In some instances, the product itself cannot be marked or cannot be practically or easily marked. This may be because there is no way to secure an identification tag to the product or because doing so would impair the use or sale of the product. For example, some physical parameter (e.g., the consistency of the product, its intended use, or its size) may make marking the product itself difficult or undesirable. For example, it would be difficult to affix an identification tag or other tracking element described herein (e.g., a representation of a unique identifier) to a product that is a liquid, cream, gel, ointment, salve, oil or oil-based product, powder, granulate, aerosol, or the like. Similarly, and for reasons that may have more to do with safety, sterility, and practical use, it may be undesirable to affix an identification tag or other tracking element described herein to a medication, food, seeds or other plant material, and the like. Similarly, and because of their size or nature, it may be difficult to affix an identification tag or other tracking element described herein to small products (e.g., microchips or other small electronic components, beads, gemstones, jewelry items, and the like) or fragile products (e.g., glassware). In these instances, the identification tag can be contained within or affixed to the packaging that immediately contains the product itself. We may refer to this packaging as "packaging for a product" or as the "immediate product container."

In other instances, the product itself can be marked. For example, where the product's physical size and nature allows, an identification tag or other tracking element described herein can be embedded in or otherwise affixed to the product itself.

While the identification tag of the invention and systems or methods employing it are described further below, we wish to note here that the identification tag and other marking elements of the invention can be variously placed and configured depending, at least in part, on the nature of the product to be tracked. For example, where it is difficult or impractical to mark the product itself (i.e., the item the ultimate consumer will actually use), the identification tag can be embedded in or otherwise affixed to the immediate product container (e.g., embedded within a closure for a bottle or tube containing the product itself), and additional marking elements (e.g., a representation of a unique identifier) can be placed on additional layers of the overall packaging. For example, a product can be contained within an immediate product container comprising an identification tag and that immediate product container can be placed within additional packaging, which we may refer to herein as an outer container. For example, a liquid, semi-liquid, or granular product can be placed in a bottle, jar, ampule, tube, or the like, which serves as the immediate product container, and that immediate product container can then be placed in an outer product container such as a box, cylinder, bag, or the like. The immediate product container can include the identification tag and the outer container can be marked as described further below (e.g., with a representation of a unique identifier). Even further, the outer container can be placed in a shipping container, either alone or with a plurality of other products (which may be the same as one another or different from one another). The shipping container can also be marked with a representation of a unique identifier as described further below.

In one embodiment, a product is placed within an immediate product container that includes an identification tag, and a plurality of different products are then placed in an outer container to form a "kit." The representation of the unique identifier placed on the outer container can include a code signifying the contents of the kit. In this way, by analyzing the representation of the unique identifier on the outer container and the identification tags on any immediate product containers within the kit, one can determine whether the content of the kit is genuine or whether components have been removed, replaced, or are being sold separately without authorization. The same is true where the product is not necessarily within a kit but where a plurality of products have been placed in the same shipping container. Due to the combined use of an identification tag as described herein and further representations of unique identifiers placed on the product or some layer of the product's packaging (e.g., the outer container or the shipping container), one can determine whether a shipment remains genuine and intact or whether any part of it has been removed or replaced without authorization.

We may also refer to the shipping container as a "case," and multiple cases can be further aggregated and bound as, for example, a palette. These progressively larger assemblies of products help to illustrate that the compositions and methods described herein can be variously applied to product packaging at any of the multiple levels in which packaging is applied to a product. By aggregating the signals and codes provided by the identification tags and representations described herein, one can, upon identifying and analyzing any given code, make any number of determinations regarding a product. For example, one can determine whether an originally packaged product has been replaced with a counterfeit item; whether one or more products within a kit have been removed or replaced; or determine whether a shipping container contains all of its original content. By pairing the encoded information with an invoice or other documentation that accompanies a product through the supply chain, one can also determine at which point the product ceased to be distributed as intended. In any of the embodiments described herein, a signal emanating from an identification tag and the information encoded by a representation can be linked or "aggregated" (e.g., within a database) so any later disruption or separation of those once-aggregated signals and codes can be detected.

Where the product itself can be marked (e.g., where an identification tag can be embedded in or otherwise affixed to the product itself), additional marking elements (e.g., representations of unique identifiers) can be placed on one or more of any of the following layers of packaging, if used: the immediate product container, an outer container, and a shipping container.

In one aspect, the present invention features an identification tag as described herein. In a related aspect, the invention features packaging for a product that includes the identification tag and is useful in discouraging and/or detecting counterfeiting and product diversion. The packaging for a product can include a closure that is configured to close a product container (e.g., an immediate product container), with the closure having a body that prevents access to an identification tag embedded therein without irreversibly damaging the package. The identification tag provides two levels of protection in that it includes (a) a radio frequency identification device (RFID) configured to receive a query signal from an RFID reader and, in response to receiving the query signal, transmit a response signal representing a first unique product identifier associated with the closure, and (b) identification information corresponding to the unique product identifier associated with the closure. The identification tag can be embedded in the closure (or elsewhere in the immediate product container) in such a way that it is not visible to the naked eye. That alone helps protect the product because it will not be evident that a security measure is in place. Even further, if it becomes known or suspected that an RFID is present, and if that RFID is disabled by a counterfeiter or diverter, the second level of protection (the identification information) can still be detected by breaching the closure or otherwise exposing the identification tag, and retrieving the tag.

While any given product (e.g., a pharmaceutical, nutraceutical, perfume, cosmetic, skin care product, food or beverage, and the like) can be packaged with only the identification tag described herein, this tag can also be a part of more elaborate protection systems. For example, the identification tag can be used in concert with either a first representation of a unique identifier that is associated with (e.g., engraved on) the immediate product container (e.g., a bottle, vial, tube, jar, or the like), a second representation of a unique identifier that is associated with (e.g., printed on) an outer container in which the immediate product container is placed (e.g., a box, a cylindrical container, a molded container, a plastic or cellophane bag or wrapper), a shipping container, a container that gathers products into a kit, or any combination thereof. Any of the representations of unique identifiers, including the first and second representations just described, can be identical or can include at least some identical information, which is discussed further below.

In a particular embodiment, the product itself is one in which an identification tag can be embedded or otherwise affixed. In this instance, any representations of unique identifiers can also be placed on the product itself (e.g., on a different part of the product in order to determine whether the product is being sold intact or as it was manufactured) and/or on any layer of the packaging in which the product may be subsequently placed (e.g., in or on an immediate product container, an outer container, or a shipping container).

In another aspect, the invention features methods of packaging and/or indelibly marking a product can include the steps of embedding or otherwise affixing the identification tag to the product itself or to a part of the immediate product container. While we discuss the closure and closure body at length, the identification tag can be embedded in any other part of the product as well. In addition to embedding the identification tag, the methods can include inserting the product into a container (i.e., an outer container such as a box or bag) having an opening and/or a wall (or other retaining element of like function) including a hole therein and indelibly marking the product within the container with a first representation of a unique identifier. Alternatively, the product can be marked with this first representation before it is placed into a container or the product may be marked and not further packaged at all. In some embodiments, the product carrying an identification tag can be placed within an outer container and the methods can further include the step of indelibly marking an inner or outer surface of the container with a second representation of the unique identifier. The opening of the container can be an end, side, or other portion of the container (e.g., a portion from which one or more flaps extend); when the opening is closed (e.g., when the flaps are folded over the opening and secured), the container is closed. Where an inner surface of the container is marked, that surface may be one that is readily exposed during the marking process (e.g., a surface of a flap that, when closed, comes to reside on the inside of the container). The marking can be indelible, which is beneficial in that such markings remain associated with the products over their expected lifetimes under the usual conditions of manufacture, transport, sale, and use. For example, an indelible mark is one that cannot be removed without damaging the underlying product or container.

In summary, the invention features an identification tag and methods that include associating that identification tag with a product (e.g., by embedding it in a part of the product packaging such as a closure body). The methods extend to associating the identification tag with a product and also applying a first representation of a unique identifier to the product and/or applying a second representation of the unique identifier to a container in which the product is placed.

Various embodiments of the method may include one or more of the following features.

The method may include securing or capturing the product within the container after indelibly marking the product through the opening in the container. The method may include securing the product within the container before or after indelibly marking the product by directing the first representation to the product through the hole in the wall of the container. Where the product is secured within the container it is attached to the container, and where the product is captured by the container it is wholly or partially enveloped by the container.

Indelibly marking the product and a surface (e.g., an inner or outer surface) of the container may include one or more of printing, laser engraving, etching, stamping, embossing, or dyeing the first and second representations of the unique identifier on the product and on an outer surface of the container. The first representation and/or the second representation of the unique identifier may include a machine-readable code and/or a human-readable code. The machine-readable code may include a two-dimensional code or a three-dimensional code (e.g., Braille or a Braille-like code). The human-readable code may include an alphanumeric code and/or a symbolic code. At least a portion of the code (e.g., the human-readable code) may be randomized and/or may include a manufacturer identifier.

The methods may include storing an association of an invoice number (or other document item that is uniquely associated with a given product) and one or more of the unique identifiers in a database (the unique identifiers constituting one or more of the information carried by the identification tag and the first and second representations on the product and/or the outer product packaging). Where the methods include more than embedding the identification tag, the methods may include forming the hole in a retaining element (e.g., a wall) of the container (e.g., by a die cutting process). In any of the embodiments involving a stored association, that association may reference either an invoice number or a number or other identifier on another type of document (i.e., the association may be with, but is not necessarily with, a document that includes billing, inventory, marketing, product cost information, or other product literature (e.g., safety and use information)).

In any embodiment, the stored association can associate an invoice number (or other document item) with one or both of the unique identifiers and also with a representation of a plurality of the products (e.g., a lot number) or some other characteristic shared by a plurality of the products. For example, a representation may be made assigned to products that include a material of a certain grade (e.g., grade A or organic material) or from a certain source (e.g., a certain laboratory). The representations of these shared characteristics (shared lot, shared source, etc. . . . ) can be separate from the first and second representations of the unique identifiers or may be included in either or both of those representations. For example, any representation can be configured to include numerous pieces of information regarding a given product. For example, a representation having a plurality of fields (e.g., 3-30 fields) can include information that, when decoded, specifies a unique product identifier, a SKU (stock keeping unit), and a lot code. For example, in a representation having 15 fields, the first six can represent the unique product identifier, the seventh through eleventh can represent the SKU, and the twelfth through fifteenth can represent the lot code.

In another aspect, the invention features an apparatus that automates a process of product marking as described herein. For example, the invention features an apparatus having a moving component such as a conveyor belt or automated arms that grasp and move products from site to site (e.g., from a site where they are unclosed and/or unlabeled to a site where they are closed and/or labeled). The belt can have a length, and the apparatus can include a first marking device configured to place a tagged closure on the product and/or indelibly mark a product on the conveyor belt with a first representation of a unique identifier. The apparatus can also include a second marking device configured to indelibly mark the product or an outer surface of a container containing the product (e.g., while on the conveyor belt) with a second representation of the unique identifier, and a controller for causing the first marking device to mark the product and the second marking device to mark the product or the outer surface of the container when the product and/or the container reach a specified position or positions along the length of the conveyor belt. In other embodiments, the apparatus could be configured to capture and place a product within the path of a marking device.

In various embodiments, an apparatus of the invention may include one or more of the following features.

The first marking device may be configured to mark the product while the product is within the container. The first marking device and/or the second marking device may include a printing device, an etching device, a stamping device, an embossing device, a dyeing device, and/or a laser engraving device. In some embodiments, the first marking device and the second marking device can be the same device (i.e., a single device can carry out both the product marking and container marking; a single device can mark the product with the first representation and mark the container with the second representation). The apparatus may include a computing device in communication with a database, and the computing device can be configured to store an association between the unique identifier and an invoice number in the database. The apparatus may include a first sensor for detecting when the container and/or the product has reached a first position along the length of the conveyor belt and a second sensor for detecting when the container and/or the product has reached a second position along the length of the conveyor belt. In some embodiments, the first sensor and the second sensor can be the same sensor (i.e., a single sensor can detect the container and the product). In some embodiments, the apparatus is configured to mark cosmetic or personal care items (e.g., the conveyor belt or apparatus that transfers the product to a target location for labeling can be one that is unable to bear the weight of products weighing more than about one pound).

The first representation of the unique identifier may include a machine-readable code and/or a human-readable code. The second representation of the unique identifier may include a machine-readable code and/or a human-readable code. The machine-readable code may include a two-dimensional code and/or a three-dimensional code. The human-readable code may include an alphanumeric code and/or a symbolic code. A portion of the code (e.g., the human-readable code) may be randomized and/or may include a manufacturer identifier.

In another aspect, the invention features methods of product diversion and counterfeiting management that include indelibly marking the product with a representation of a unique identifier, and storing an association of the product, the unique identifier, and supply chain tracking information for the product in a database.

In various embodiments, these methods may include one or more of the following features.

The method may further include, upon receiving the product at a supply chain entity of a supply chain, updating the supply chain tracking information for the product in the database to indicate that the product was received by the supply chain entity.

In another general aspect, a method for product diversion and counterfeiting management includes receiving a representation of a unique identifier associated with a product, querying a database including a plurality of associations between unique identifiers, invoice numbers, and supply chain tracking information to determine whether the unique identifier is represented in the database, providing an indication that the product is a counterfeit product if the unique identifier is not represented in the database, and providing an indication that the product is an authentic product and an indication of a supply chain entity that most recently received the product if the unique identifier is represented in the database, including determining the indication of the supply chain entity that most recently received the product based on the supply chain tracking information associated with the unique identifier.

In another aspect, the invention features software embodied on a non-transitory, computer-readable medium that includes instructions for causing a processing element to implement a method for product diversion and counterfeiting management. The method includes receiving a representation of a unique identifier associated with a product, querying a database including a plurality of associations between unique identifiers, invoice numbers, and supply chain tracking information to determine whether the unique identifier is represented in the database, providing an indication that the product is a counterfeit product if the unique identifier is not represented in the database, providing an indication that the product is an authentic product and an indication of a supply chain entity that most recently received the product if the unique identifier is represented in the database, including determining the indication of the supply chain entity that most recently received the product based on the supply chain tracking information associated with the unique identifier.

Various aspects and embodiments of the present invention may include one or more of the following advantages. The machinery and methods described herein allow one to not only mark products individually, but also to mark each container in which a given product is placed. By marking the product while it is already inside of the container (whether yet sealed or secured or not), the likelihood of having a mismatch between the marking on the product and a corresponding mark on the container is minimized, and each marking can correspond to a different unique identifier. Using a laser engraving device to mark the product is advantageous since a laser engraved mark is more difficult to remove than, for example, a printed mark. Marking the product with a human readable (e.g., an alphanumeric or symbolic) identifier allows for a human to read the identifier such that they can easily provide the identifier to a diversion and counterfeiting avoidance system (e.g., via a computer application). By using a randomized unique identifier, problems associated with the predictability of sequential or patterned unique identifiers can be averted.

Other features and advantages of the invention are apparent from the following description, and from the claims.

DETAILED DESCRIPTION

The Identification Tag

Figure 1A:
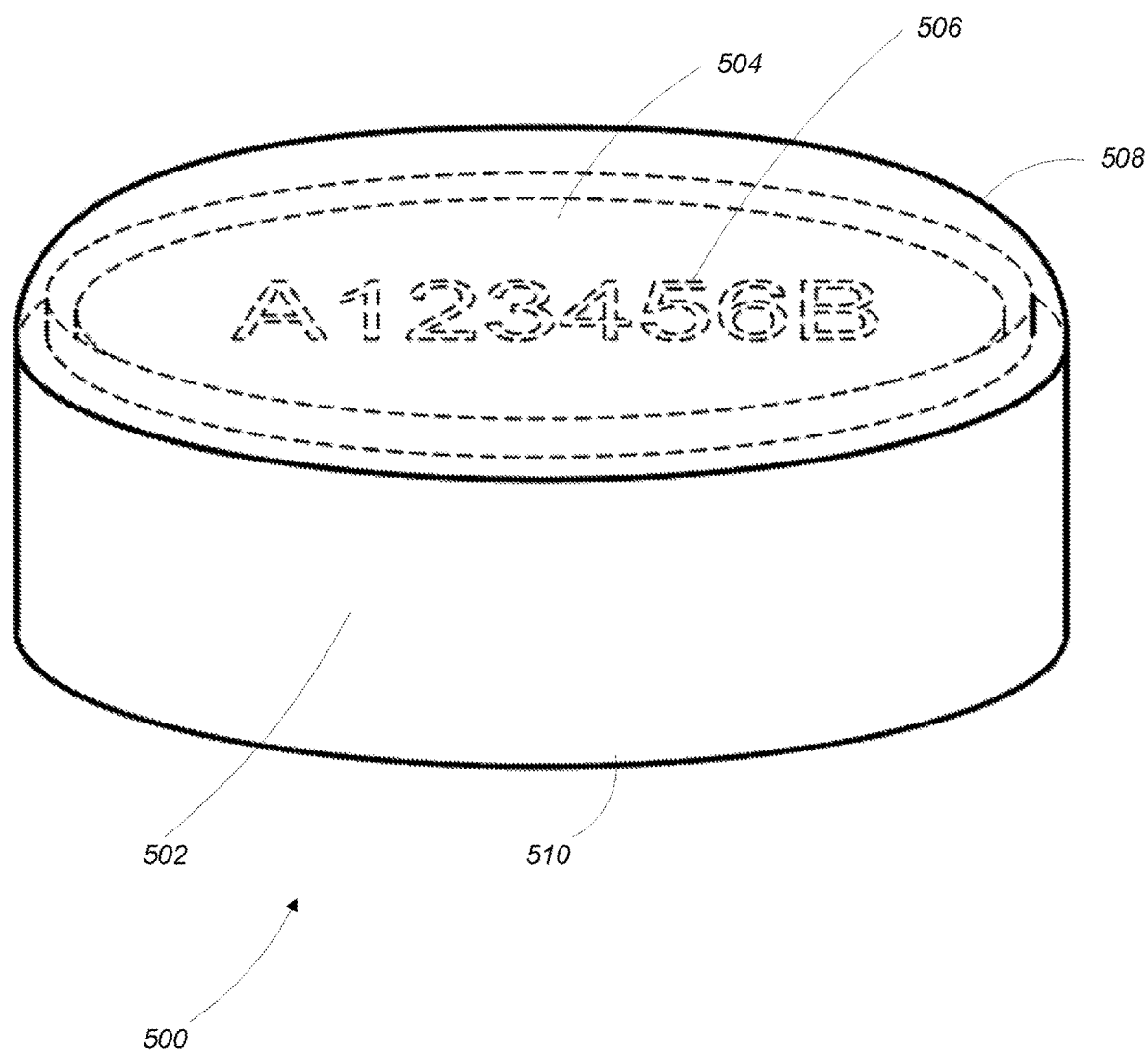
FIG. 1A is a closure.

As noted, the present invention features packaging for a product (e.g., the immediate container for the actual product) that includes a closure configured to close a product container. Referring to FIG. 1A, the closure 500 includes a closure body 502 that prevents access to an identification tag 504 embedded therein without irreversibly damaging the closure body 502. The identification tag 504 includes (a) a radio frequency identification device (RFID) configured to receive a query signal from an RFID reader and, in response to receiving the query signal, to transmit a response signal representing a first unique product identifier associated with the closure, and (b) identification information 506 corresponding to the unique product identifier associated with the closure. In some examples, the identification information 506 is indelibly marked on the identification tag 504 (e.g., by printing) and can include one or more of a letter code, a number code, an alphanumeric code, a bar code, a symbol code, a two-dimensional code, or a three-dimensional code (e.g., Braille or a raised or otherwise tactile Braille-like code). The closure body 502 includes a first portion 508 and a second portion 510.

Figure 1B:
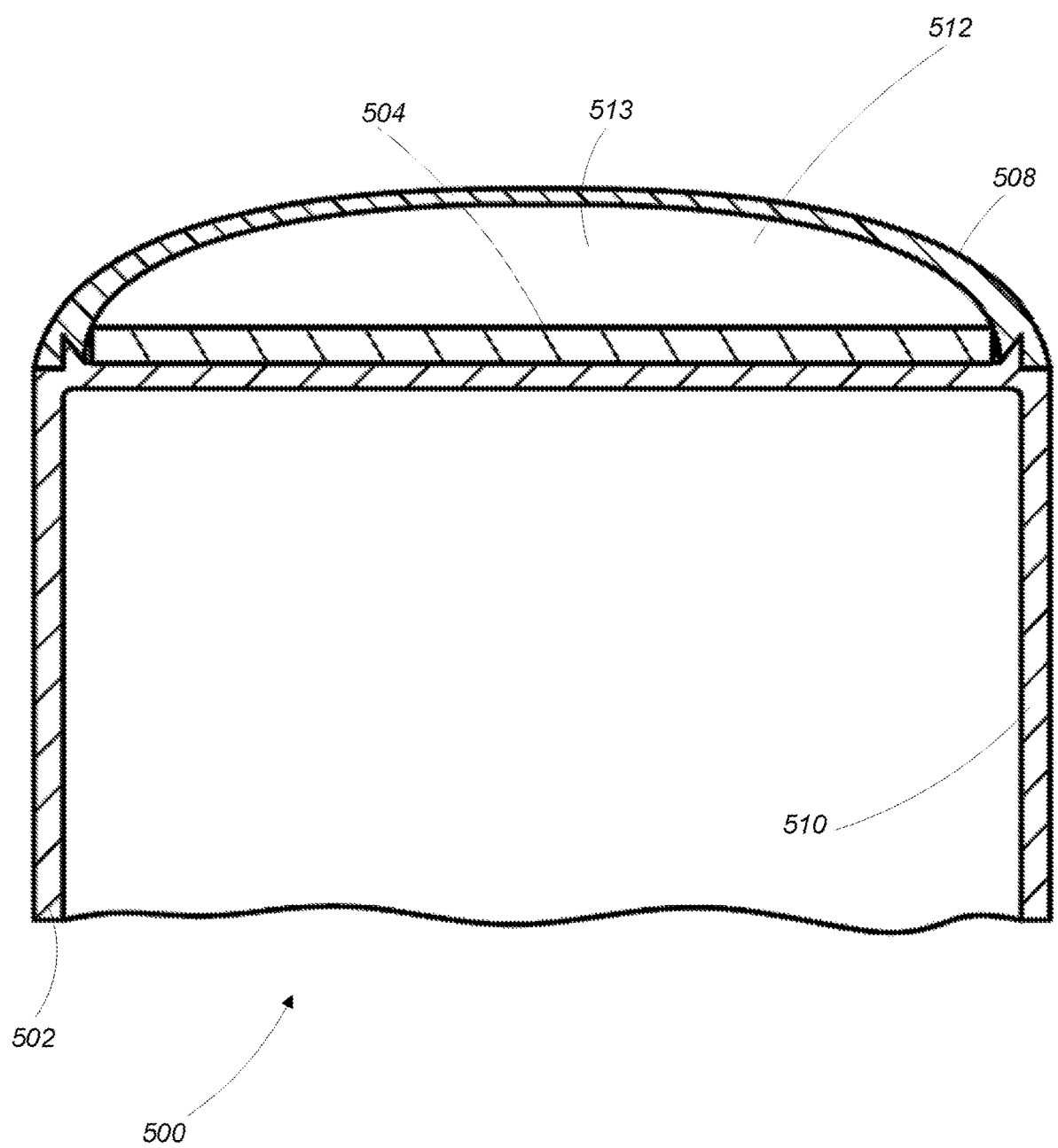
FIG. 1B is a cross-sectional view of the closure of FIG. 1A.

Referring to FIG. 1B, the first portion 508 of the closure body 502 and the second portion 510 of the closure body 502 are attached (e.g., by an adhesive or a welding process) to one another such that a chamber 512 is defined between the two portions 508, 510. In some examples, the closure 500 has a height of 28.2 mm and a diameter of 48.5 mm. In some examples, the first portion 508 has a height of 5.5 mm. In some examples, the wall thickness of the first portion 508 is 0.8 mm. In some examples, the chamber 512 has a height of 1 mm.

The identification tag 504 resides within the chamber 512 but does not entirely fill the volume of the chamber, resulting in the existence of an air gap 513 in the chamber 512. In the example shown in FIG. 1B, the identification tag 504 is attached (e.g., by an adhesive disposed on one side of the identification tag 504) to the second portion 510 of the closure body 502. However, in some examples, the identification tag 504 is attached to the first portion 508 of the closure body 502. In yet other examples, the identification tag 504 is not attached to either the first portion 508 or the second portion 510, but is instead simply contained in the chamber 512 without being attached.

The arrangement shown in FIG. 1B permits irreversible removal of some or all of the first portion 508 from the closure body 502 without causing damage to the identification tag 504. For examples, part of the first portion 508 can be removed without damaging the identification tag 504 (due at least in part to the presence of the air gap 513 in the chamber 512. In FIG. 1B, the first portion 508 of the closure body 502 has a convex, domed shape. However, the first portion 580 of the closure body 502 may be formed in a variety of other shapes including, but not limited to flat shapes or concave shapes.

Figure 1C:
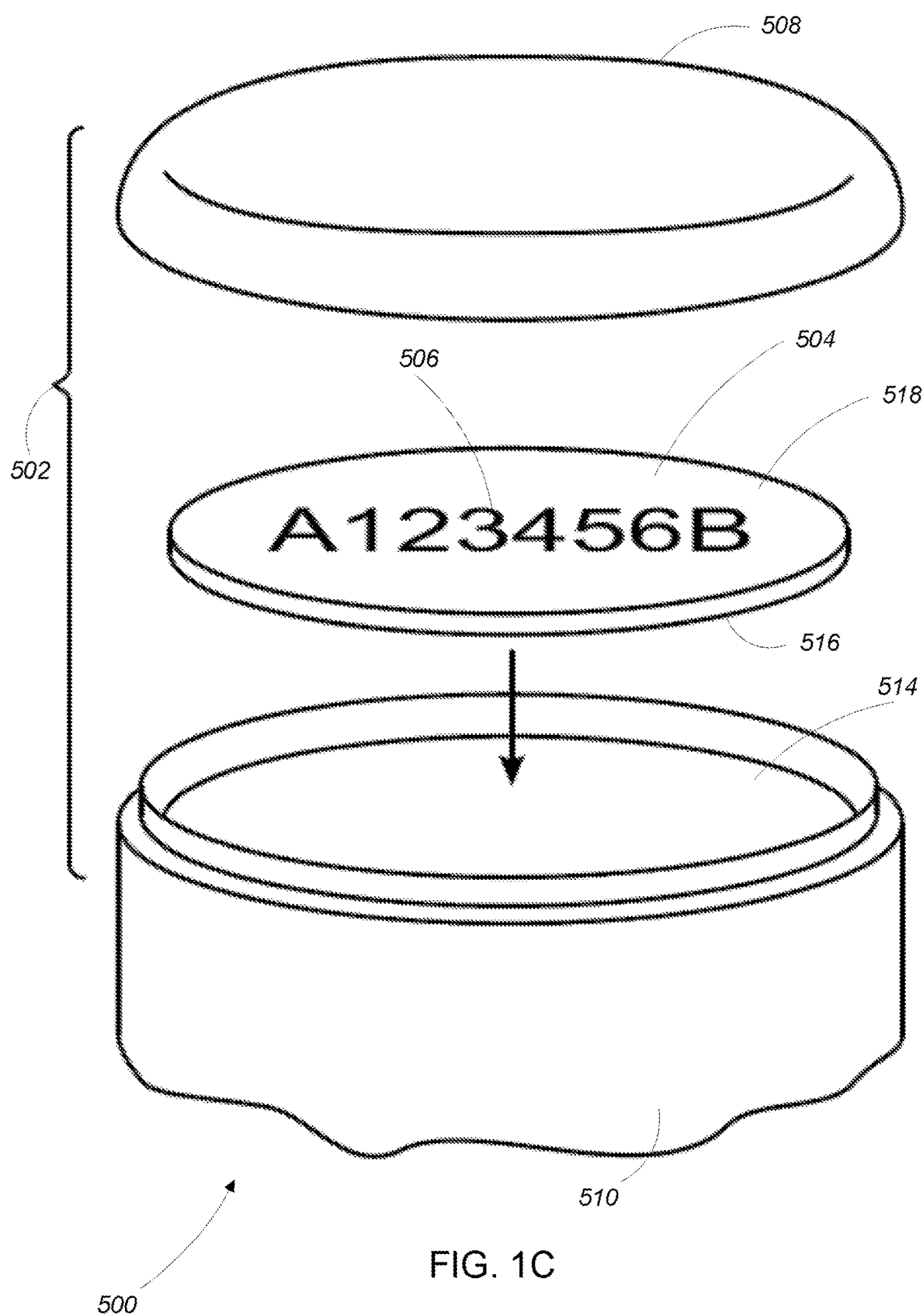
FIG. 1C is an exploded view of the closure of FIG. 1A.

Referring to FIG. 1C, the second portion 510 of the closure body 502 includes a tag receiving portion 514 which is sized and shaped to receive the identification tag 504. In an assembly process for the closure 500, the identification tag 504 is placed into the tag receiving portion 514 such that an adhesive layer (not shown) disposed on an underside 516 of the identification tag 504 makes contact with the second portion 510 of the closure body 502 and the identification information 506 on the top side 518 of the identification tag 504 faces away from the second portion 510 of the closure body 502.

Figure 1D:
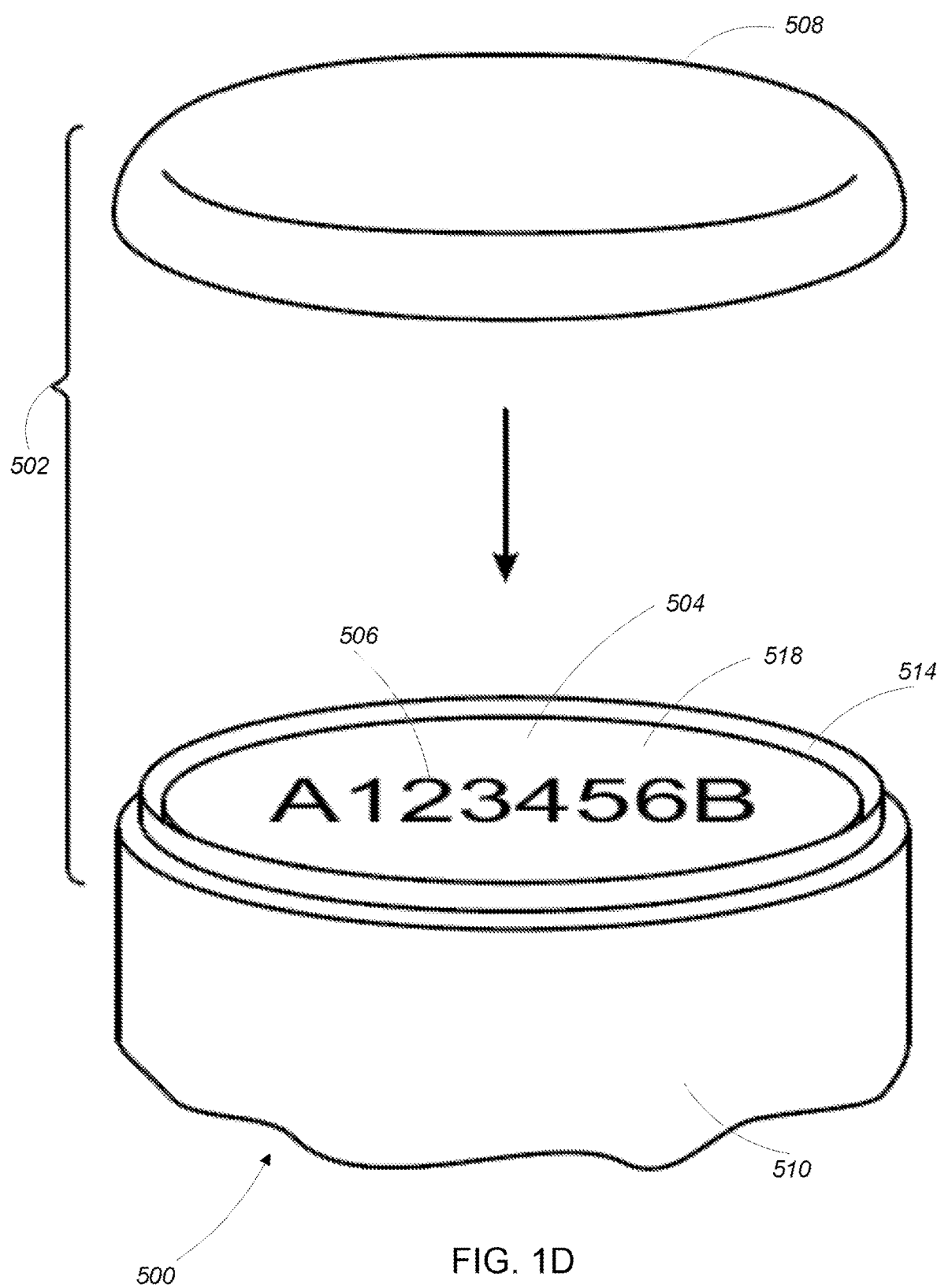
FIG. 1D is a partially assembled view of the closure of FIG. 1A.

Referring to FIG. 1D, with the identification tag 504 disposed in the tag receiving portion 514, the first portion 508 of the closure body 502 is placed onto and permanently attached to the second portion 510 of the closure body 502 such that the identification tag 504 is contained in the chamber 512. In some examples, an adhesive is applied to one or both of the first portion 508 and the second portion 510 of the closure body 502 prior to placing the first portion 508 onto the second portion 510. In some examples, heat is applied to melt part of one or both of the first portion 508 and the second portion 510 of the closure body 502 prior to placing the first portion 508 onto the second portion 510. After attachment of the first portion 508 and the second portion 510, the melted part of the first portion 508 and/or the second portion 510 is allowed to cool. In some examples, other techniques such as ultrasonic welding or a snap-lock connection are used to permanently attach the first portion 508 and the second portion 510.

In other embodiments, the identification tag can be a film that is applied directly to the closure body 502 without the need for an adhesive. Instead of a direct application, the firm may simply be retained between the first and second portions of the closure body, 508 and 510; the first and second portions, 508 and 510, seal or secure the film in place and may be closely opposed to the film on both sides of the film, thereby greatly reducing or eliminating the air gap 513. In any instance where a film is employed, the film will be indelibly marked with identification information 506 (e.g., by printing) and, as with a disc-shaped tag, can be marked one or more of a letter code, a number code, an alphanumeric code, a bar code, a symbol code, a two-dimensional code, or a three-dimensional code (e.g., Braille or a raised or otherwise tactile Braille-like code).

The packaging can also include a product container that is detachably or non-detachably attached to the closure and that is configured to be closed by the closure.

The product container (i.e., the outer container) can be marked with a second representation of the unique product identifier. The packaging can further include an outer container with the product container secured therein, and that outer container can be marked with a third representation of the unique product identifier. Any of the representations associated with the product can include a machine-readable code and/or a human-readable code (e.g., a letter code, a number code, an alphanumeric code, a bar code, a symbol code, a two-dimensional code, or a three-dimensional code). At least a portion of the human-readable code can be randomized and/or can include a manufacturer identifier.

The unique product identifiers that are represented on the product or its packaging can be associated with an invoice number or other document associated with the product.

In another aspect, the invention features methods of determining whether a product has been diverted from its intended supply chain. These methods can be carried out by (a) receiving a packaged product comprising a product within a product container having a closure (e.g., the closure 500 described above) disposed thereon, wherein the closure 500 comprises a closure body 502 that prevents access to an identification tag 504 embedded therein without irreversibly damaging the package. As is described above, the identification tag 504 includes (i) a radio frequency identification device (RFID) configured to receive a query signal from an RFID reader and, in response to receiving the query signal, transmit a response signal representing a first unique product identifier associated with the closure 500, and (ii) identification information 506 corresponding to the unique product identifier associated with the closure; (b) breaching the closure body 502; and (c) determining whether the packaged product has been diverted from its intended supply chain based at least in part on assessing the identification information 506. In general, breaching of the closure body 502 cannot be reversed and a breached closure body 502 may provide an indication that the closure 500 has been tampered with.

One can assess the identification information by querying a database that associates the identification information with the identity of the last party in the intended supply chain to have received the product.

Any of the methods can also include a step of analyzing the product, with a difference between the product analyzed and a sample of the product originally packaged indicating that the product has been tampered with.

In another aspect, the invention features methods of packaging a product in a product container, the method comprising: receiving the product container with the product disposed therein; and closing the product container by affixing a closure to an opening of the product container, wherein the closure is configured to close the product container and comprises a closure body that prevents access to an identification tag embedded therein without irreversibly damaging the package, the identification tag comprising (a) a radio frequency identification device (RFID) configured to receive a query signal from an RFID reader and, in response to receiving the query signal, transmit a response signal representing a first unique product identifier associated with the closure, and (b) identification information corresponding to the unique product identifier associated with the closure. These methods can further include inserting the product container with the closure affixed thereto into an outer container having an opening and/or a wall including a hole therein, and indelibly marking the product container within the outer container with a first representation of a unique identifier and indelibly marking an outer surface of the outer container with a second representation of the unique identifier. Further, one can secure the product container within the outer container (e.g., after indelibly marking the product container through the opening in the outer container).

Figure 2:
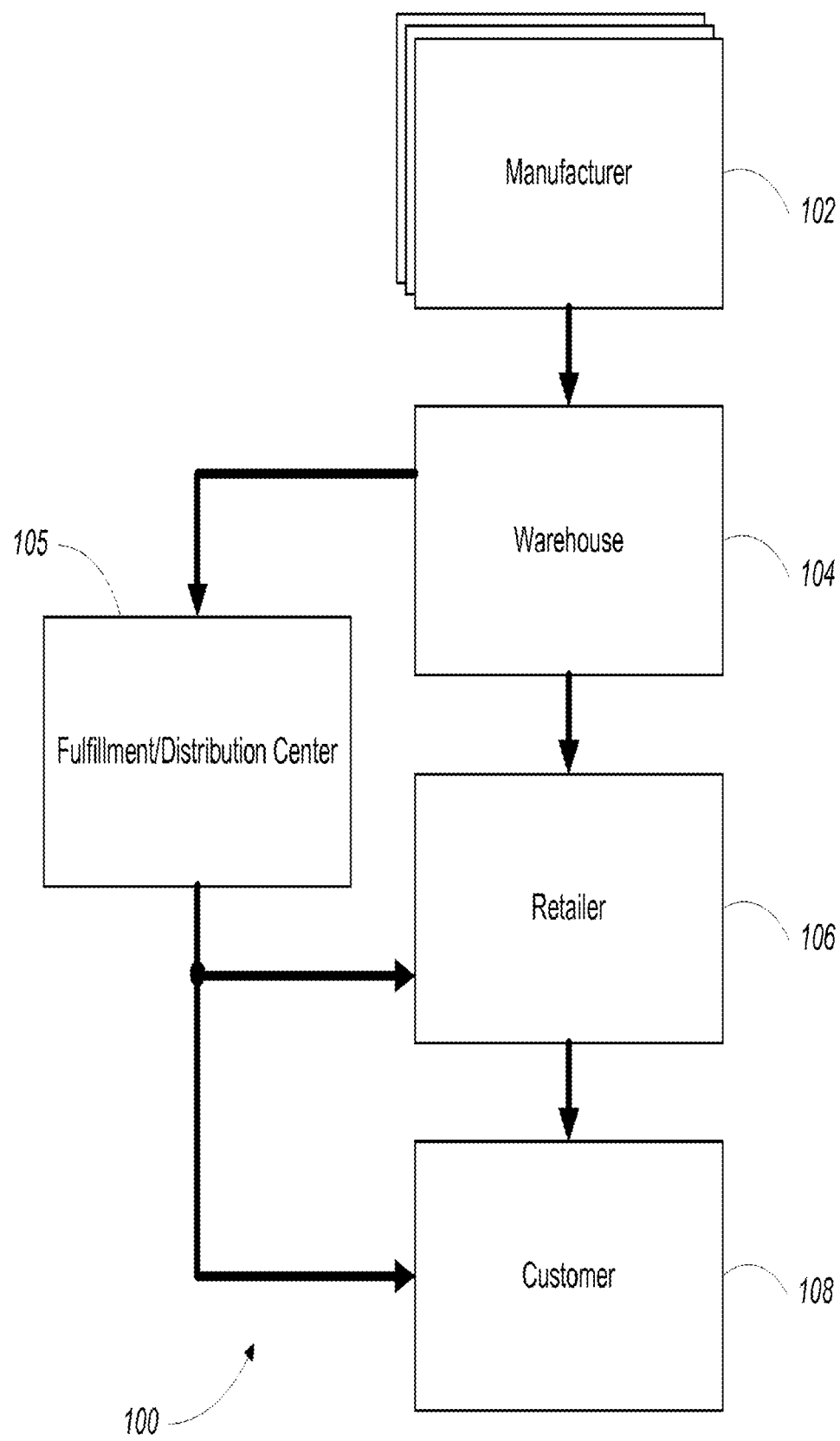
FIG. 2 is a product distribution channel.

An Elaboration on Product Diversion Systems in which the Identification Tag can be Employed FIG. 2 illustrates an example of a product distribution system 100 for a product that includes one or more manufacturers 102, a fulfillment/distribution center 105, a warehouse 104, an authorized retailer 106, and a customer 108. In a scenario where no product diversion occurs, the manufacturer(s) 102 manufacture the product and ship the product to the warehouse 104. The warehouse 104 ships the products to the fulfillment/distribution center 105 and/or the retailer 106.

In the case that the warehouse 104 ships the product to the fulfillment/distribution center 105, the fulfillment/distribution center 102 supplies the product to the customer 108 and/or the retailer 106. In the case that the warehouse 104 ships the product to the retailer 106, the retailer 106 sells the product to the customer 108.

Figure 3:
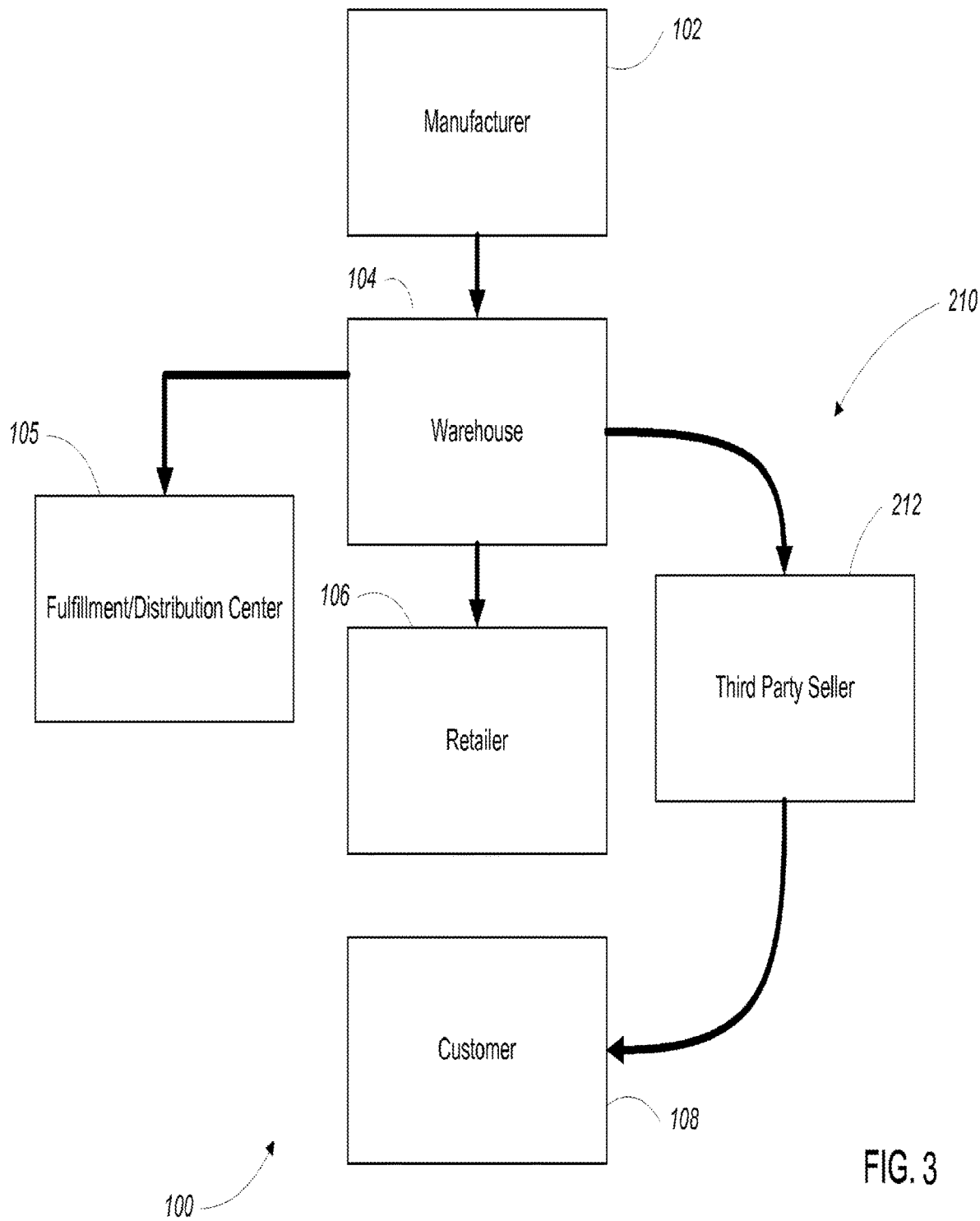
FIG. 3 is a product distribution channel with a product diversion channel.

FIG. 3 illustrates one example of a product diversion channel 210. The product diversion channel 210 is established in this example when the warehouse 104 sells the product to a third party seller 212 (e.g., an unauthorized internet retailer such as a web seller or an e-commerce site; the third party seller may also have obtained the product by theft from any point or any point of transfer in the distribution system). The third party seller then sells the product to the customer 108, bypassing the authorized retailer 106 and/or the fulfillment/distribution center 105 in the process. In some instances, a disreputable warehouse may divert the product by selling it directly to customers. In either event, the product is likely to be sold at a lower price than that offered by the authorized retailer 106 or the fulfillment/distribution center 105. As a result, product diversion, as illustrated by the product diversion channel 210, adversely affects the retailer's ability to price and sell the product with the expected profit margin. This can, in turn, harm the warehouse and manufacturer and upstream suppliers. In addition, the reputation of the product can be adversely affected if the third party seller 212 or a disreputable warehouse sells damaged or expired units of the product to customers. In other circumstances, the third party seller or any unauthorized seller can also seek to profit by removing a product from its container and replacing it with a counterfeit version. The original, authentic product could, additionally, be sold separately (i.e., without its original packaging).

In general, product diversion channels are possible at any stage in the product distribution system 100. For example, the retailer 106 may buy an excess of product from the warehouse 104 and sell the excess product to the customer 108 via a third party seller 212 or another alternative channel. Another possible product diversion channel involves an employee at the manufacturer 102, the warehouse 104, or the fulfillment/distribution center 105 stealing product and selling the stolen product to the customer 108 (e.g., by advertising the product on line or on an unauthorized website) or the retailer 106.

Product Diversion Avoidance

In some examples, to detect and mitigate product diversion channels, the invention features specialized product marking schemes that include marking the product and/or a container that holds the product with one or more representations of a unique identifier. When the product is shipped from the manufacturer 102, the unique identifier is associated with an invoice number (e.g., by scanning the representation of the unique identifier with a hand-held scanner) and stored in a database. The marked product is then tracked through the distribution channel. An entity within the channel would record receipt of the product as well as shipment of the product to the next entity in the distribution channel (e.g., by scanning the representation of the unique identifier with a hand-held scanner). For example, each entity could read the unique identifier, as discussed further below. When diversion or counterfeiting is suspected, the product can be examined/scanned again to determine which entity in the distribution chain was the last to receive it.

Through-Container Product Marking

Figure 4:
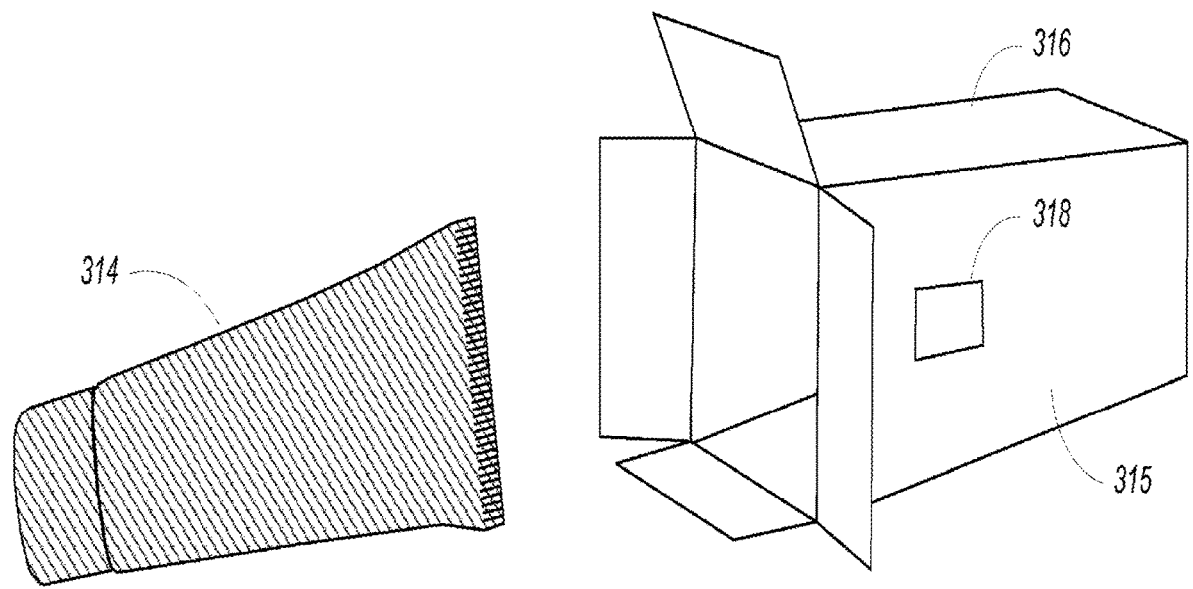
FIG. 4 is a product before it is inserted into its container.

Referring to FIG. 4, an immediate product container 314 and an outer container 316 are shown, with the immediate product container 314 not yet inserted into the outer container 316. The outer container 316 includes a hole 318 in one of its walls. In some embodiments, the hole 318 is die cut in the wall of the outer container 316 prior to the outer container 316 being assembled. Very generally, the through-container product marking scheme involves indelibly marking both an outer surface 315 of the outer container 316 and an outer surface of the immediate product container 314 with a representation of a unique identifier with the immediate product container 314 already inserted into the outer container 316.

Figure 5:
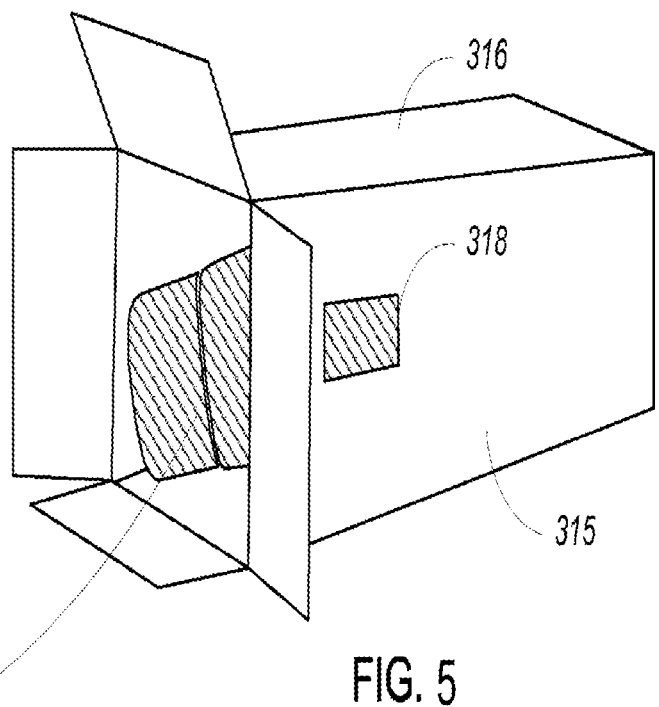
FIG. 5 is a product inserted into its container.
Figure 6:
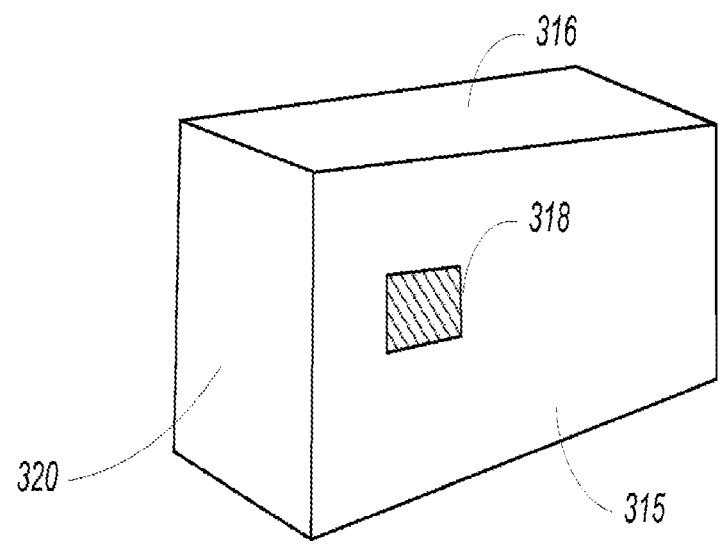
FIG. 6 is a product inserted into its container with the container closed and sealed.

The outer surface 315 of the outer container 316 can be marked using conventional indelible marking techniques, with the particular technique being selected in view of the material from which the container is made. In one embodiment, the outer surface of the immediate product container 314 is marked through the wall of the outer container 316 via the hole 318. Referring to FIG. 5, in a first step, the immediate product container 314 is inserted into the outer container 316. Note that in FIG. 5 the product is clearly visible through the wall of the outer container 316 via the opening 318. The exact size, shape, and placement of the hole can vary. Referring to FIG. 6, in a second step, an open end 320 of the outer container 316 is closed, securing the immediate product container 314 in the outer container 316. In some examples, securing the immediate product container 314 in the outer container 316 includes sealing (e.g., fastening a flap over the open end 320 of the outer container 316 using an adhesive or a tab, tuck, or pressure fit).

Figure 7:
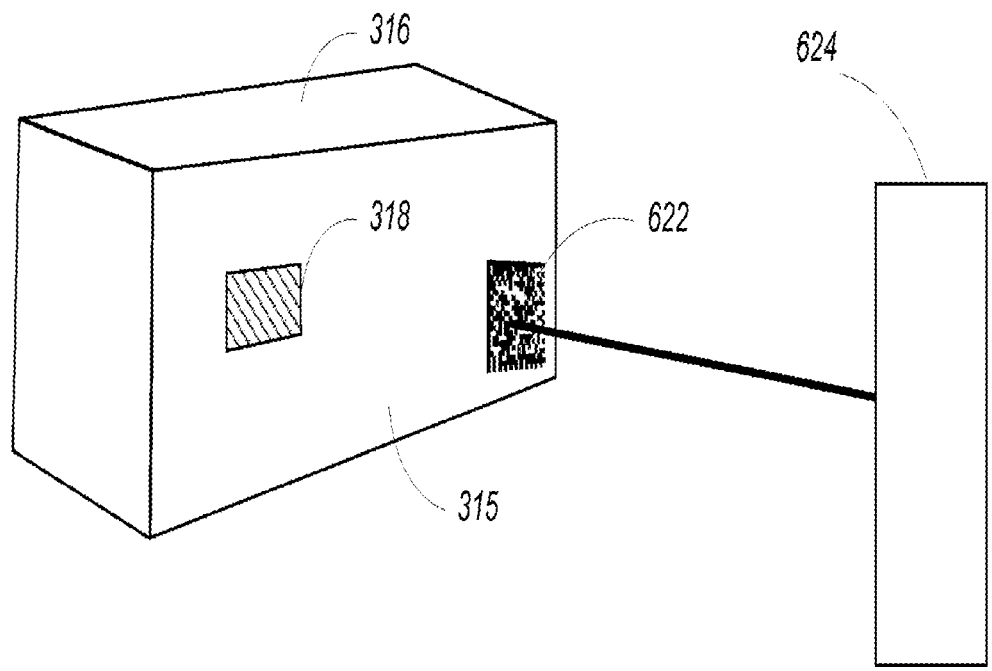
FIG. 7 shows a first representation of a unique identifier being printed onto a container.

Referring to FIG. 7, in a third step, the outer surface 315 of the wall is indelibly marked with a first representation 622 of the unique identifier. In the example shown in FIG. 7, the first representation 622 of the unique identifier is a machine-readable two-dimensional (2D) code. In other examples, a first representation 622 of the unique identifier is a three-dimensional (3D) code, a QR code, a bar code, an alphanumeric code, or another marking code as is known in the art. In some examples, the first representation 622 of the unique identifier is printed in indelible ink onto the outer surface of the wall 315 of the outer container 316 using a printer 624 (e.g., an ink jet printer or a laser printer).

Figure 8:
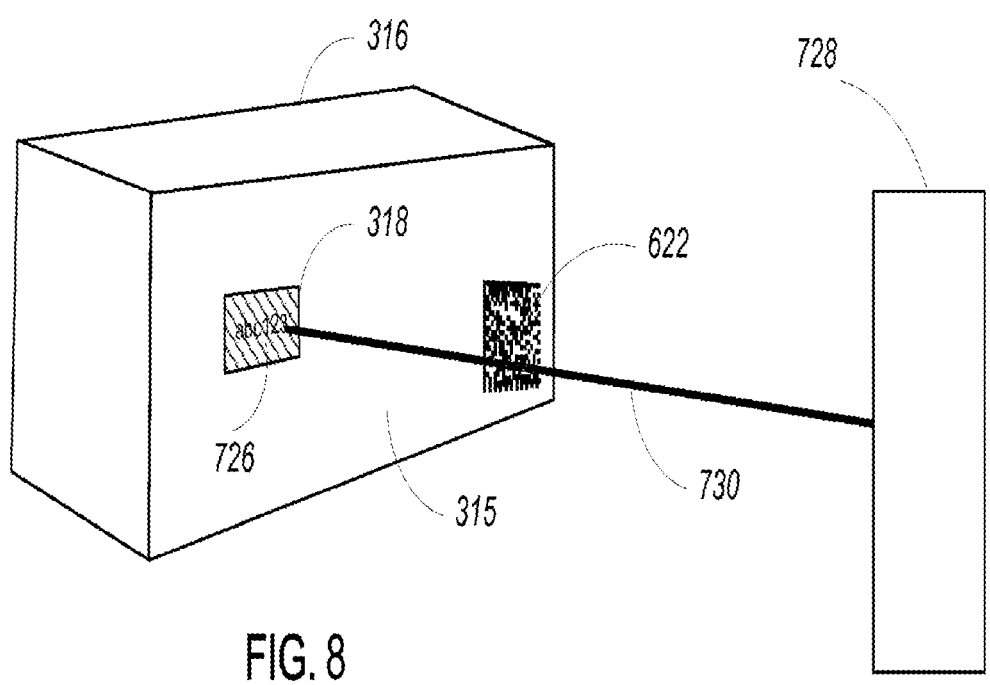
FIG. 8 shows a second representation of a unique identifier being engraved onto a product.

Referring to FIG. 8, in a fourth step, the outer surface of the immediate product container 314 is indelibly marked with a second representation 726 of the unique identifier. In FIG. 8, the second representation 726 of the unique identifier is a human-readable code (e.g., an alphanumeric code or a symbolic code). In other examples, a second representation 726 of the unique identifier is a 3D code, a 2D code, a QR code, a bar code, or another marking code as is known in the art. In some examples, the second representation 726 of the unique identifier is indelibly engraved (or etched) onto the outer surface of the immediate product container 314 using a laser engraving device 728. Note that since the immediate product container 314 is already inserted into the outer container 316, a laser beam 730 of the laser engraving device 728 must pass through the opening 318 in the wall of the outer container 316 to mark the immediate product container 314.

The product and the container in which it is placed can be marked simultaneously or sequentially in either order. As described above and illustrated in FIGS. 6 and 7, the container for the product can be marked first (with a first representation of the unique identifier) and the product can be marked subsequently (with a second representation of the unique identifier). This sequence can be reversed, with the product being marked first (with a first representation of the unique identifier) and the product's container being marked subsequently (with a second representation of the unique identifier). Thus, the first representation of the unique identifier and the second representation of the unique identifier can be marked onto the container and product in any order. Alternatively, and as noted, the product and the product's container can be marked at essentially the same time with first and second representations of the unique identifier.

As described above and illustrated in FIG. 8, the product can be marked through the opening in the wall of the container. In an alternative embodiment, the product can be placed in a container that is intact (i.e., that does not include a hole as described above) and then marked through a natural opening that will subsequently be closed (e.g., folded over and secured or closed with an adhesive or folded over and held in place by a tab, tuck, or pressure fit). For example, the product may be marked through the natural opening in the container through which it was placed. Thus, and in general, it is not required that the container be sealed in order to mark either or both of the product and the container.

In some embodiments, the container can be further manipulated by, for example, being enclosed (e.g. in cellophane) or further embellished. In some embodiments, the containers including products can be collected in a shipping container (e.g., a box or crate), and the shipping container can be further marked with a representation of a unique identifier (e.g., a different unique identifier such as a lot number that is associated or linked with all of the unique identifiers of the products and containers collected in the shipping container).

Container-Less Product Marking

Figure 9:
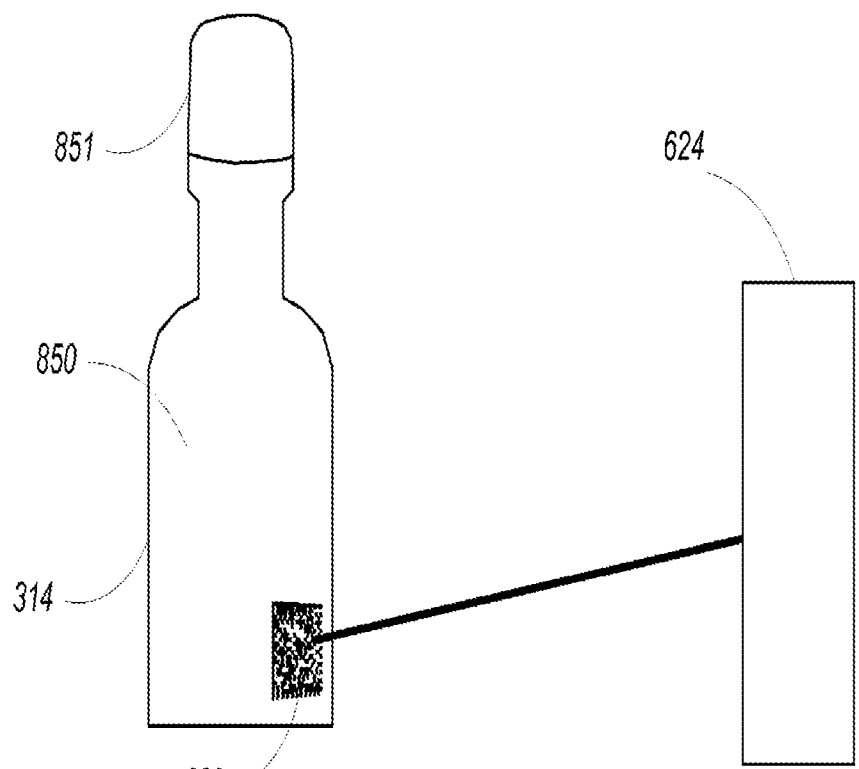
FIG. 9 shows a first representation of a unique identifier being printed onto a product.

Referring to FIGS. 8 and 9, in some examples, the immediate product container 314 is not placed in an additional container and an outer surface 850 of the immediate product container 314 is marked with both a first representation 622 of a unique identifier and a second representation 726 of the unique identifier.

For example, in FIG. 9, in a first step, the outer surface 850 of the immediate product container 314 is indelibly marked with the first representation 622 of the unique identifier. In the example shown in FIG. 9, the first representation 622 of the unique identifier is a machine-readable two-dimensional (2D) code. As was the case above, in other examples, the first representation 622 of the unique identifier is a 3D code, a QR code, a bar code, an alphanumeric code, or another marking code as is known in the art. In some examples, the first representation 622 of the unique identifier is printed in indelible ink onto the outer surface 850 of the immediate product container 314 using a printer 624 (e.g., an ink jet printer or a laser printer).

Figure 10:
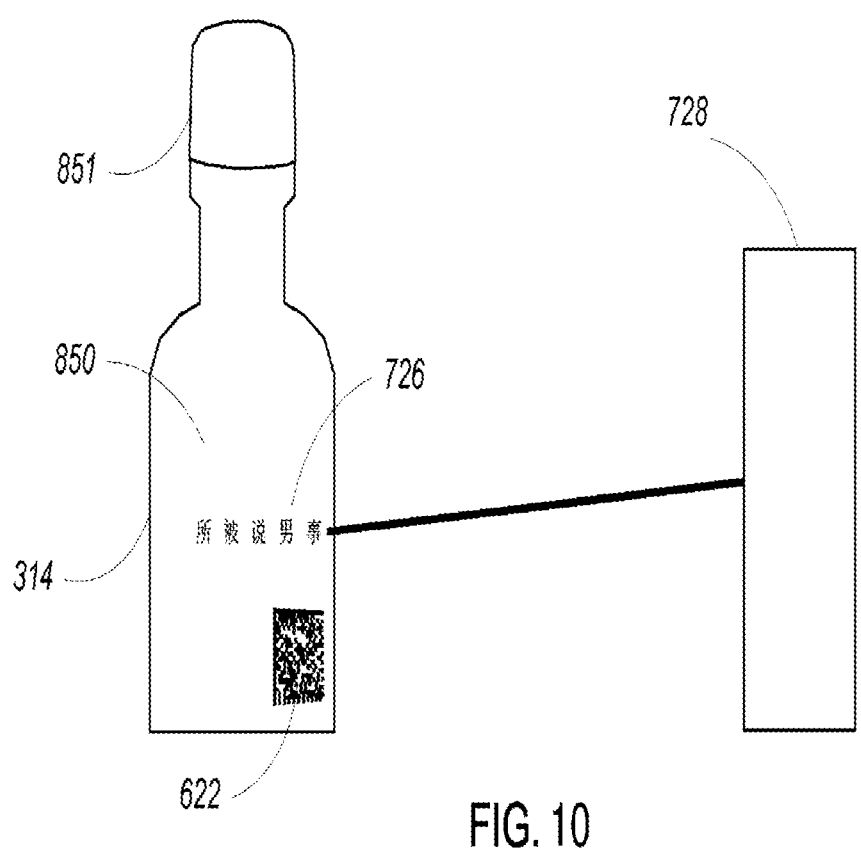
FIG. 10 shows a second representation of the unique identifier being printed onto the product of FIG. 9.

Referring to FIG. 10, in a second step, the outer surface 850 of the immediate product container 314 is indelibly marked with the second representation 726 of the unique identifier. In FIG. 10, the second representation 726 of the unique identifier is a human-readable code (e.g., an alphanumeric code or a symbolic code as is illustrated by the Chinese language symbols in FIG. 10). As was the case above, in other examples, the second representation 726 of the unique identifier is a 3D code, a 2D code, a QR code, a bar code, or another marking code as is known in the art. In some examples, the second representation 726 of the unique identifier is indelibly engraved (or etched) onto the outer surface 850 of the immediate product container 314 using a laser engraving device 728.

The first and second representations 622, 726 of the unique identifier can be marked simultaneously or sequentially in either order. As described above and illustrated in FIGS. 8 and 9, the immediate product container 314 can be marked first with the first representation 622 of the unique identifier and the immediate product container 314 can be marked subsequently with the second representation 726 of the unique identifier. This sequence can be reversed, with the immediate product container 314 being marked first with the first representation 622 of the unique identifier and the immediate product container 314 container being marked subsequently with the second representation 726 of the unique identifier. Thus, the first representation 622 of the unique identifier and the second representation 726 of the unique identifier can be marked onto the product in any order. Alternatively, and as noted, the product can be marked at essentially the same time with first and second representations 622, 726 of the unique identifier.

In some embodiments, the product can be further manipulated by, for example, being enclosed (e.g. in cellophane) or further embellished. In some embodiments, the marked products can be collected in a shipping container (e.g., a box or crate), and the shipping container can be further marked with a representation of a unique identifier (e.g., a different unique identifier such as a lot number that is associated or linked with all of the unique identifiers of the products collected in the shipping container).

In some embodiments, portions of the immediate product container 314 other than the outer surface 850 are marked with one or both of the first and second representations 622, 726 of the unique identifier. For example, a cap 851 of the immediate product container 314 may be marked with the second representation 726 of the unique identifier.

In some embodiments, the immediate product container 314 is marked with only a single representation of an identifier that is unique to the immediate product container 314.

Product Marking Apparatus

Figure 11:
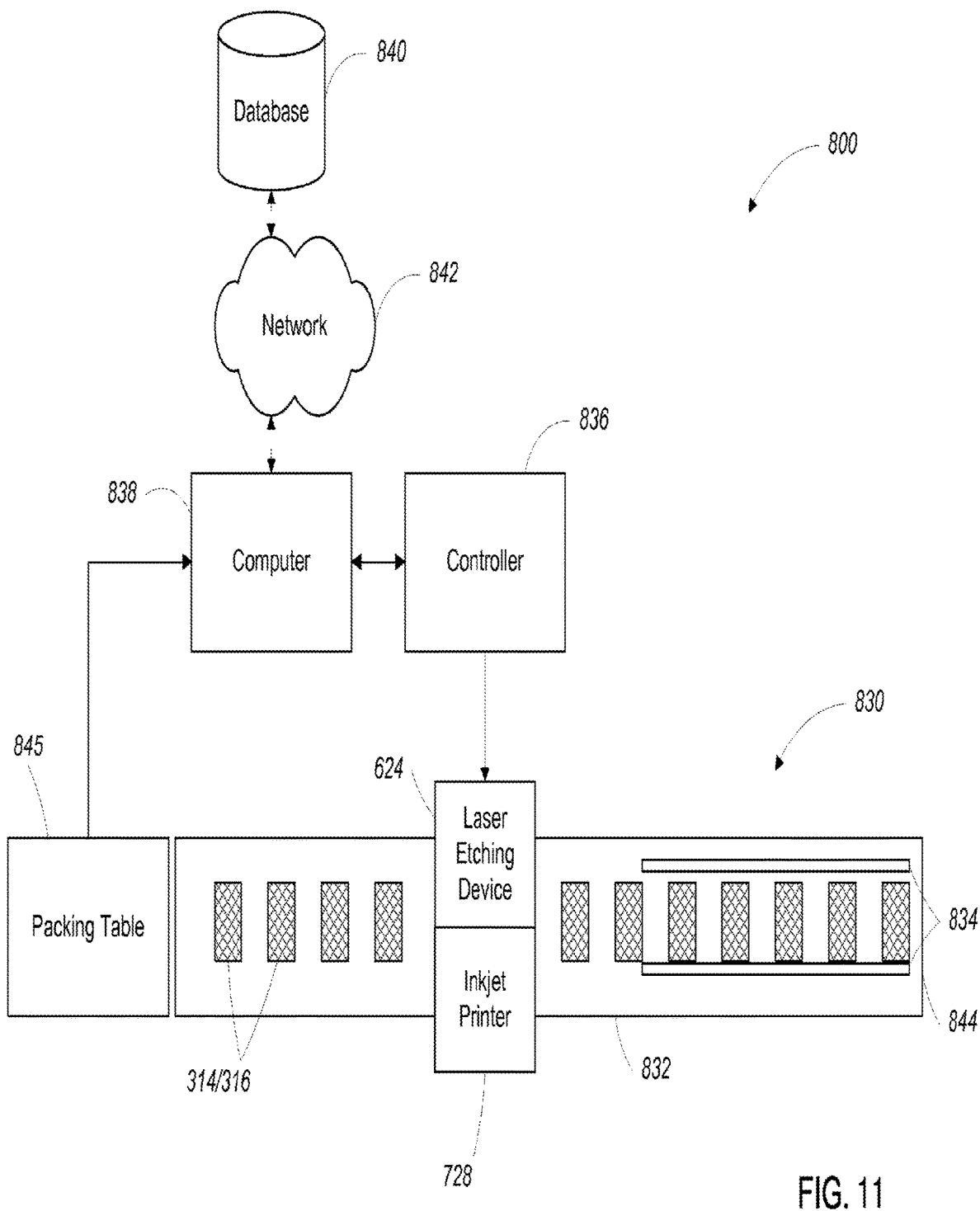
FIG. 11 is a product marking apparatus.

FIG. 11 illustrates one example of a product marking apparatus 800 that includes an assembly line 830 including a conveyor belt 832, a laser engraving device 728, an inkjet printer 624, and one or more alignment bars 834. The laser engraving device 728 and the printer 624 are controlled by a controller 836 that is in communication with (or implemented by) a computer 838 (e.g., a general purpose computing device). The computer 838 is in communication with a database 840 over a network 842 (e.g., a local area internet and/or the internet).

In operation, immediate product containers 314 or outer containers 316 including immediate product containers 314 are placed onto the conveyor belt 832 at a first end 844 of the conveyor belt 832. The conveyor belt 832 moves the containers 316 and/or products 314 in a direction from the first end 844 of the conveyor belt 832 toward a second end 846 of the conveyor belt 832. Before the conveyor belt 832 moves the containers 316 and/or products 314 past the printer 624 and the laser engraving device 728, the alignment bars 834 ensure that the containers 316 and/or products 314 are aligned into a desired position for marking.

As the conveyor belt 832 moves a given outer container 316 and/or immediate product container 314 toward the second end 846 of the conveyor belt 832 the controller 836 monitors a position of the outer container 316 and/or immediate product container 314 (using a sensor, not shown) to determine if the outer container 316 and/or immediate product container 314 is in a first position for printing the first representation 622 of the unique identifier (as provided by the computer 838) onto the outer container 316 and/or immediate product container 314. Once the controller 836 determines that the outer container 316 and/or immediate product container 314 is in the first position, it causes the printer 624 to print the first representation 622 of the unique identifier onto the outer container 316 and/or immediate product container 314.

Similarly, as the conveyor belt 832 moves the given outer container 316 and/or immediate product container 314 toward the second end 846 of the conveyor belt, the controller 836 monitors the position of the outer container 316 and/or immediate product container 314 (using another sensor, not shown) to determine if the outer container 316 and/or immediate product container 314 is in a second position for engraving the second representation 726 of the unique identifier (as provided by the computer 838) onto the product. Once the controller 836 determines that the outer container 316 and/or immediate product container 314 is in the second position, it causes the laser engraving device 729 to engrave the second representation of the unique identifier onto the immediate product container 314. In some embodiments, a sensor within the apparatus can read the leading edge of the box and, given that the speed of the conveyer belt is known, the computer can trigger the marking event when the product is appropriately positioned.

In some examples, the first position and the second position are substantially the same and the first and second representations 622, 726 of the unique identifier are marked at substantially the same time. In other examples, the first position and the second position are separated from one another and the controller 836 coordinates the timing of the marking of the first and second representations 622, 726 of the unique identifier.

At the end of the conveyor belt 832, the marked containers 316 and/or products 314 are packed for delivery at a packing table 845. In some examples, upon being packed, the containers 316 and/or products 314 are associated with an invoice number (e.g., by scanning the containers and/or products with a hand-held scanner), which is provided to the computer 838 where it is associated with the unique identifier(s) printed on the containers 316 and/or products 314. The computer 838 stores this association of an invoice number with one or more unique identifiers in the database 840 via the network 842. The associations can be made with the aid of a hand-held scanner.

Figure 12:
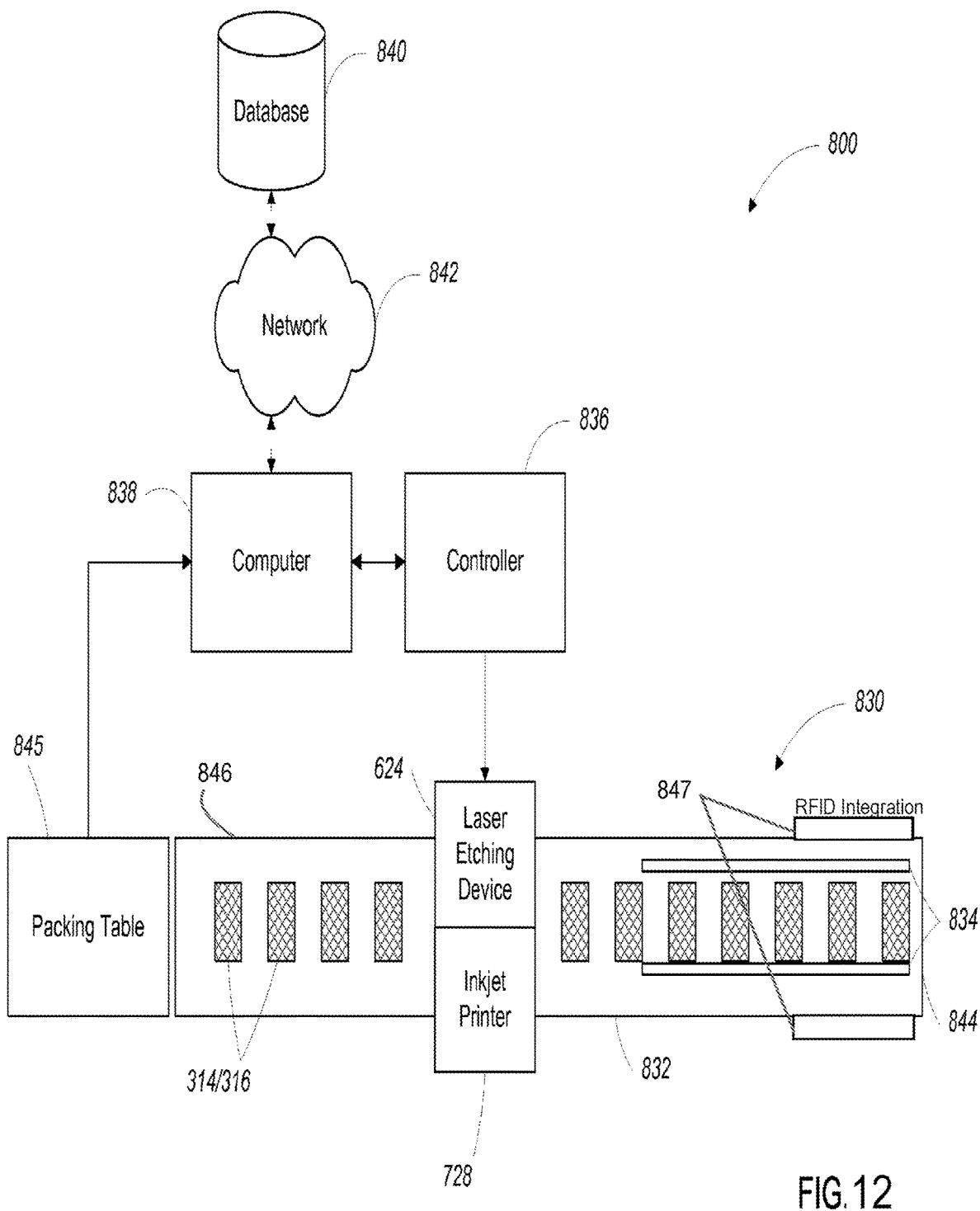
FIG. 12 is a product marking apparatus.

FIG. 12 illustrates another example of a product marking apparatus 800 that includes an RFID integration device 847.

Unique Identifier

In some examples, the native form of the unique identifiers is an alphanumeric string (i.e., the string that is engraved onto the product 316). The alphanumeric string can be transformed into an alternative (e.g., 2D code) representation.

In some embodiments, the unique identifiers are not serial in nature but are instead randomly generated. In some examples, the unique identifiers include a randomized portion and a non-randomized portion. For example, a unique identifier may include a randomly generated portion and non-randomized portion that includes a manufacturer identifier. In some embodiments, a position of the non-randomized portion in the unique identifier is randomized. In some examples, a human-readable representation of the unique identifier includes a string of one or more symbolic characters (e.g., letters from the Chinese alphabet or geometric shapes).

Diversion and Counterfeiting Control

When a customer or a quality/diversion control agent suspects that a product (e.g., a product found at an esthetician's office or on an internet retailer's website) may have been diverted or is a counterfeit product, they can read the unique identifier from the product and use it to query the database. In some examples, the agent enters (e.g., manually or by an automated scanning process) the human-readable unique identifier into a computer application (e.g., a mobile application, a web application, or a stand-alone personal computer application) which is configured to query the database to determine whether the unique identifier is associated with an authentic but diverted or counterfeited product. In the case of a diverted product, since the database includes an association of the unique identifiers with invoice numbers, the invoice number associated with the unique identifier can be used to trace the product to the last entity in the supply chain to register the product's invoice number. Further investigation can then be performed to determine whether that entity did, in fact, divert the product. If so, the entity can be removed from the distribution channel.

In the embodiments described above, indelible marking is performed using printers and laser engravers. However, any suitable indelible marking technology can be used to indelibly mark products and containers, including but not limited to stamping, embossing, dyeing, and etching.

In any of the embodiments described herein, the product can be a cosmetic product formulated, for example, to cleanse, protect or improve the appearance of the skin, hair, or nails.

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). In general, software features of the above-described embodiments include instructions embodied on non-transitory, computer-readable media (i.e., computer-readable media which does not encompass transitory forms of signal transmission, such as a propagating electrical or electromagnetic signal).

While the embodiments described herein include a closure with an RFID tag embedded therein, it should be noted that other types of non-RFID based identification devices may be embedded in the closure. For example, a near-field communication (NFC) identification device or an ultra-high frequency (UHF) identification device may be embedded in the closure. More generally, any device that is small enough to be embedded in the closure, is able to transmit a unique identifier (in some cases in response to a query), and is queryable from its embedded position in the closure can be used.

Further details relating to product diversion control systems and methods in which the anti-diversion, anti-counterfeiting product packaging can be used are described in Ser. No. 62/132,444, entitled, Product Diversion Management, filed on Mar. 12, 2015, the contents of which are incorporated herein by reference.

What is claimed is:

1. Packaging for a product, the packaging comprising a closure, wherein the closure is configured to close a product container and comprises a closure body that prevents access to an identification tag embedded therein without irreversibly damaging the closure body, the identification tag comprising (a) a radio frequency identification device (RFID) configured to receive a query signal from an RFID reader and, in response to receiving the query signal, transmit a response signal representing a first unique product identifier associated with the closure, and (b) identification information corresponding to the unique product identifier associated with the closure.

2. The packaging of claim 1, wherein the closure body includes a first portion and a second portion that are associated to define a chamber and the identification tag resides within the chamber and is optionally attached to either the first portion or the second portion of the closure body.

3. The packaging of claim 1, wherein the identification information is indelibly marked on the identification tag.

4. The packaging of claim 1, wherein the identification information comprises a letter code, a number code, an alphanumeric code, a bar code, a symbol code, a two-dimensional code, or a three-dimensional code.

5. The packaging of claim 1, further comprising a product container that is detachably or non-detachably attached to the closure, wherein the product container is configured to be closed by the closure.

6. The packaging of claim 5, wherein the product container is marked with a second representation of the unique product identifier.

7. The packaging of claim 6, further comprising an outer container with the product container secured therein, wherein the outer container is marked with a third representation of the unique product identifier.

8. The packaging of claim 7, wherein the second representation and/or the third representation of the unique product identifier includes a machine-readable code and/or a human-readable code.

9. The packaging of claim 7, wherein the second representation and/or the third representation includes a letter code, a number code, an alphanumeric code, a bar code, a symbol code, a two-dimensional code, or a three-dimensional code.

10. The packaging of claim 8, wherein at least a portion of the human-readable code is randomized and/or comprises a manufacturer identifier.

11. The packaging of claim 1, wherein the unique product identifier is associated with an invoice number or other document associated with the product.

12. A method of determining whether a product has been diverted from its intended supply chain, the method comprising:
    (a) receiving a packaged product comprising a product within a product container having a closure disposed thereon, wherein the closure comprises a closure body that prevents access to an identification tag embedded therein without irreversibly damaging the closure body, the identification tag comprising (i) a radio frequency identification device (RFID) configured to receive a query signal from an RFID reader and, in response to receiving the query signal, transmit a response signal representing a first unique product identifier associated with the closure, and (ii) identification information corresponding to the unique product identifier associated with the closure;
    (b) breaching the closure body; and
    (c) determining whether the packaged product has been diverted from its intended supply chain based at least in part on assessing the identification information.

13. The method of claim 12, wherein assessing the identification information comprises using the identification information to query a database that associates the identification information with the identity of the last party in the intended supply chain to have received the product.

14. The method of claim 12, further comprising a step of analyzing the product, wherein a difference between the product analyzed and a sample of the product originally packaged indicates that the product has been tampered with.

15. A method of packaging a product in a product container, the method comprising:
    receiving the product container with the product disposed therein; and
    closing the product container by affixing a closure to an opening of the product container, wherein the closure is configured to close the product container and comprises a closure body that prevents access to an identification tag embedded therein without irreversibly damaging the closure body, the identification tag comprising (a) a radio frequency identification device (RFID) configured to receive a query signal from an RFID reader and, in response to receiving the query signal, transmit a response signal representing a first unique product identifier associated with the closure, and (b) identification information corresponding to the unique product identifier associated with the closure.

16. A method of packaging a product in a product container, the method comprising:
    receiving the product container with the product disposed therein;
    closing the product container by affixing a closure to an opening of the product container, wherein the closure is configured to close the product container and comprises a closure body that prevents access to an identification tag embedded therein without irreversibly damaging the closure body, the identification tag comprising (a) a radio frequency identification device (RFID) configured to receive a query signal from an RFID reader and, in response to receiving the query signal, transmit a response signal representing a first unique product identifier associated with the closure, and (b) identification information corresponding to the unique product identifier associated with the closure; and inserting the product container with the closure affixed thereto into an outer container having an opening and/or a wall including a hole therein, and indelibly marking the product container within the outer container with a first representation of a unique identifier and indelibly marking an outer surface of the outer container with a second representation of the unique identifier.

17. The method of claim 16, further comprising securing the product container within the outer container, wherein the product container is secured after indelibly marking the product container through the opening in the outer container.

18. The method of claim 16, further comprising securing the product container within the outer container, wherein the product container is secured before or after indelibly marking the product container by directing the first representation through the hole in the wall of the outer container.

19. The method of claim 16, wherein indelibly marking the product container and the outer surface of the outer container comprises one or more of printing, laser engraving, etching, stamping, embossing, or dyeing the first and second representations of the unique identifier on the product container and on the outer surface of the outer container.

20. The method of claim 16, wherein the first representation and/or the second representation of the unique identifier includes a machine-readable code and/or a human-readable code.

21. The method of claim 20, wherein the machine-readable code includes a two-dimensional code or a three-dimensional code.

22. The method of claim 20, wherein the human-readable code includes an alphanumeric code and/or a symbolic code.

23. The method of claim 20, wherein at least a portion of the human-readable code is randomized.

24. The method of claim 20, wherein a portion of the human-readable code comprises a manufacturer identifier.

25. The method of claim 16, further comprising storing an association of an invoice number or other document associated with the packaged product and one or more of the unique identifiers in a database.

* * * * *